United States Patent
Nagashima et al.

(10) Patent No.: US 10,103,529 B2
(45) Date of Patent: Oct. 16, 2018

(54) WIRE HARNESS

(71) Applicant: Yazaki Corporation, Tokyo (JP)

(72) Inventors: Toshihiro Nagashima, Makinohara (JP); Shinichi Inao, Makinohara (JP); Hideomi Adachi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/619,945

(22) Filed: Jun. 12, 2017

(65) Prior Publication Data

US 2017/0358911 A1 Dec. 14, 2017

(30) Foreign Application Priority Data

Jun. 14, 2016 (JP) .................................. 2016-117780

(51) Int. Cl.
*H02G 3/04* (2006.01)
*B60R 16/02* (2006.01)
*B60R 16/033* (2006.01)

(52) U.S. Cl.
CPC ....... *H02G 3/0468* (2013.01); *B60R 16/0215* (2013.01); *B60R 16/033* (2013.01); *H02G 3/0481* (2013.01); *H02G 3/0487* (2013.01)

(58) Field of Classification Search
CPC .. H02G 3/0468; H02G 3/0481; H02G 3/0462; H02G 3/0475; H02G 3/0487; H02G 11/00; B60R 16/0215; F16L 11/115; F16L 11/15
USPC ....... 174/102 D, 126.3, 72 C, 105 D, 106 D; 138/119, 121
See application file for complete search history.

(56) References Cited

U.S. PATENT DOCUMENTS

| 6,933,439 B2 * | 8/2005 | Nishihara ........... B60R 16/0222 174/481 |
| 7,504,579 B2 * | 3/2009 | Frank .................. H02G 3/0468 174/36 |
| 7,886,774 B1 * | 2/2011 | Popp .................... F16L 25/0045 138/118 |

(Continued)

FOREIGN PATENT DOCUMENTS

| JP | 2008-92644 A | 4/2008 |
| JP | 2014-42408 A | 3/2014 |
| JP | 201493800 A | 5/2014 |

OTHER PUBLICATIONS

Communication dated Jun. 26, 2018, from the Japanese Patent Office in counterpart application No. 2016-117780.

*Primary Examiner* — Chau N Nguyen
*Assistant Examiner* — Roshn Varghese
(74) *Attorney, Agent, or Firm* — Sughrue Mion, PLLC (57) ABSTRACT

A wire harness, comprising a tube-shaped exterior member and one or multiple conductive paths to be inserted into and protected by the exterior member. The exterior member includes a flexible tube part having a flexible bellows tube shape and a straight tube part not having the flexible bellows tube shape. The one or multiple conductive paths are straightly wired into the straight tube part and the straight tube part is continuous with the flexible tube part. A continuous portion of the flexible tube part and the straight tube part includes multiple reinforcement shape portions which are capable of withstanding stress concentration in the continuous portion and are arranged in a tube outer peripheral direction of the exterior member.

4 Claims, 7 Drawing Sheets

(56) References Cited

U.S. PATENT DOCUMENTS

| | | | |
|---|---|---|---|
| 8,826,943 B2* | 9/2014 | Sheffer | A61M 16/0875 138/115 |
| 2002/0083991 A1* | 7/2002 | Sorkin | E04C 5/10 138/121 |
| 2003/0075227 A1* | 4/2003 | Lepoutre | F02M 35/10137 138/119 |
| 2010/0000764 A1 | 1/2010 | Suzuki | |
| 2015/0136481 A1* | 5/2015 | Inao | H02G 3/0481 174/72 A |
| 2015/0217708 A1 | 8/2015 | Adachi et al. | |

* cited by examiner

WIRE HARNESS

CROSS REFERENCE TO RELATED APPLICATIONS

This application claims priority from Japanese Patent Application No. 2016-117780 filed on Jun. 14, 2016, the entire contents of which are incorporated herein by reference.

BACKGROUND OF THE INVENTION

Field of the Invention

The invention relates to a wire harness including a tube-shaped exterior member and one or multiple conductive paths to be inserted into and protected by the exterior member.

Description of Related Art

In order to electrically connect together devices mounted on a car, there is used a wire harness. The wire harness is constituted of a tube-shaped exterior member and one or multiple conductive paths to be inserted into the exterior member. For example, in the below cited patent document 1: JP-A-2014-93800, a wire harness is wired so as to pass through the vehicle underfloor of a car. Such part of the wire harness as corresponds to the vehicle underfloor is wired straight. Such wire harness is formed in an elongated shape and thus the exterior member constituting the wire harness is also formed in an elongated shape.

The exterior member is a resin molded product and includes a flexible tube part having a conductive bellows tube shape and a straight tube part not having such flexibility as the flexible tube part has. The flexible tube part and straight tube part are formed continuously with each other. The straight tube part is formed as a part on which the conductive path can be arranged straight and also the outer peripheral surface of which is formed in a shape without irregularities.

In the below cited patent document 1, besides the structure of the wire harness, there are also disclosed the manufacture, transportation and route wiring of the wire harness. In the transportation and route wiring time of the wire harness, the flexible tube part of the exterior member is bent and the long straight tube part is arranged in the vehicle underfloor.

[Patent Document 1] JP-A-2014-93800

According to a related art, a continuous portion of a flexible tube part and straight tube part of the exterior member provides a location where stress tends to concentrate. Therefore, when receiving vibrations during running of the vehicle, cracks and breakage can occur in the continuous portion due to stress concentration. Here, for example, in the transportation and in the route wiring in the vehicle underfloor, a load such as a bending load is applied to the wire harness and thus, in this case as well, cracks and breakage can occur.

SUMMARY

One or more embodiments provide a wire harness which can prevent occurrence of cracks and breakage due to stress concentration.

In accordance with one or more embodiments, a wire harness includes a tube-shaped exterior member and one or multiple conductive paths to be inserted into and protected by the exterior member. The exterior member includes a flexible tube part having a flexible bellows tube shape and a straight tube part not having the flexible bellows tube shape. The one or multiple conductive paths are straightly wired into the straight tube part and the straight tube part is continuous with the flexible tube part. A continuous portion of the flexible tube part and the straight tube part includes multiple reinforcement shape portions which are capable of withstanding stress concentration in the continuous portion and are arranged in a tube outer peripheral direction of the exterior member. Each of the multiple reinforcement shape portions is a projecting portion which connects a slope of bellows projection of the flexible tube part and an outer peripheral surface of the straight tube part and which has a substantially polygonal shaped side surface or a substantially ¼ circular shaped side surface.

According to one or more embodiments, in the continuous portion of the flexible tube part and straight tube part of the exterior member, the multiple reinforcement shape portions function as parts which work effectively for increasing strength. Therefore, according to the invention, for example, when stress concentration occurs in the continuous portion due to vibrations given thereto during running of a vehicle, the multiple reinforcement shape portions (the reinforcement shape portions which provide projections having the characteristic shape, or, the reinforcement shape portions scattered in the tube outer peripheral direction) can withstand the stress concentration. So long as the reinforcement shape portions can withstand the stress concentration, occurrence of cracks and breakage in the continuous portion can be prevented.

In the wire harness of one or more embodiments, the multiple scattered reinforcement shape portions may be arranged at an equal pitch in the tube outer peripheral direction.

According to one or more embodiments, the strength in the continuous portion of the flexible tube part and straight tube part can be enhanced uniformly in the tube outer peripheral direction.

According to one or more embodiments, there is provided an effect that occurrence of cracks and breakage due to stress concentration can be prevented. Also, there is provided an effect that occurrence of cracks and breakage due to stress concentration can be prevented more positively.

BRIEF DESCRIPTION OF THE DRAWINGS

FIGS. 1A and 1B show a wire harness according to the invention.

FIGS. 4A and 4B are section views of the exterior member shown in FIG. 3.

FIGS. 5A and 5B show section views of a modification of FIGS. 4A and 4B.

DETAILED DESCRIPTION

A wire harness is constituted of a tube-shaped exterior member including a flexible tube part and a straight tube part formed continuously with each other, and one or multiple conductive paths which are inserted into and protected by the exterior member. The flexible tube part of the exterior member is formed in a flexible bellows tube shape. Meanwhile, the straight tube part is formed as a part which does not have such flexibility as the flexible tube part has, a part on which the conductive path will be arranged straight, and a non-bellows tube shaped part.

In the continuous portion of the flexible tube part and straight tube part, multiple reinforcement shape portions capable of withstanding stress concentration in the continuous portion are scattered in the tube outer peripheral direction. The multiple scattered reinforcement shape portions are formed in a projecting portion which connects the slope of the bellows projection of the flexible tube part to the outer peripheral surface of the straight tube part, and in a projecting portion which has a side surface having a substantially polygonal shape or a side surface having a substantially ¼ circle shape. Also, the multiple scattered reinforcement shape portions are arranged at an equal pitch in the tube outer peripheral direction.

[Embodiment 1]

Figure 1A:
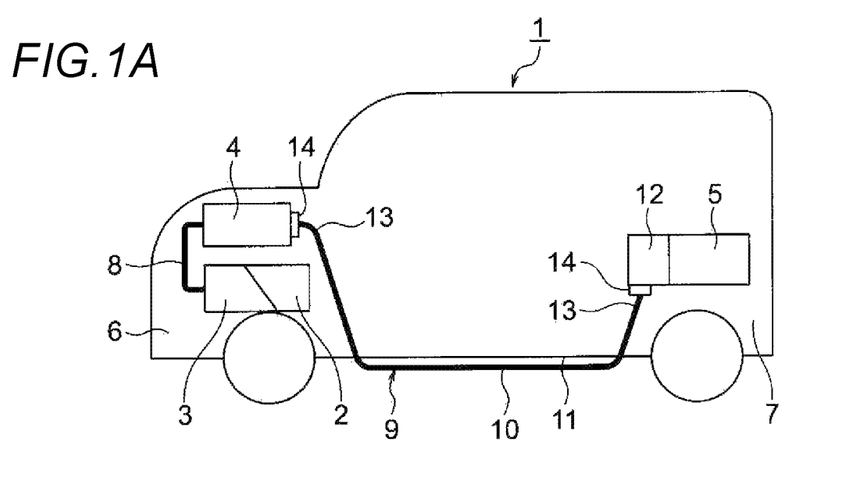
FIG. 1A is a schematic view of the wired state of a high voltage wire harness.
Figure 1B:
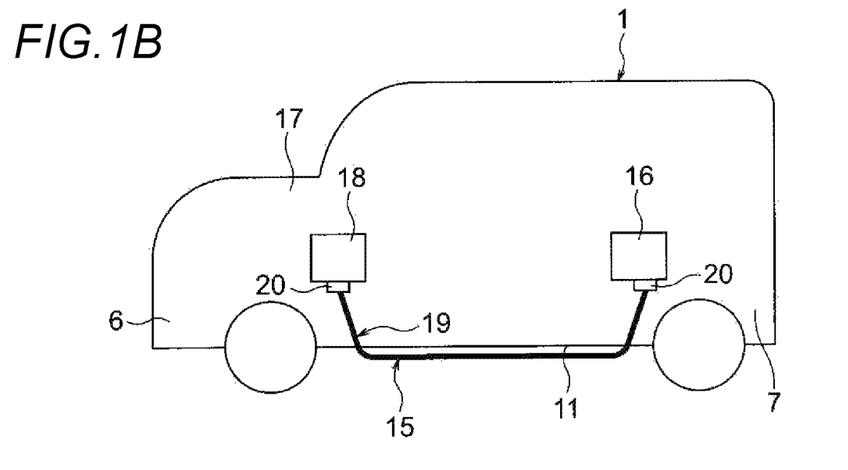
FIG. 1B is a schematic view of the wired state of a low voltage wire harness different from the wire harness shown in FIG. 1A (Embodiment 1).
Figure 2:
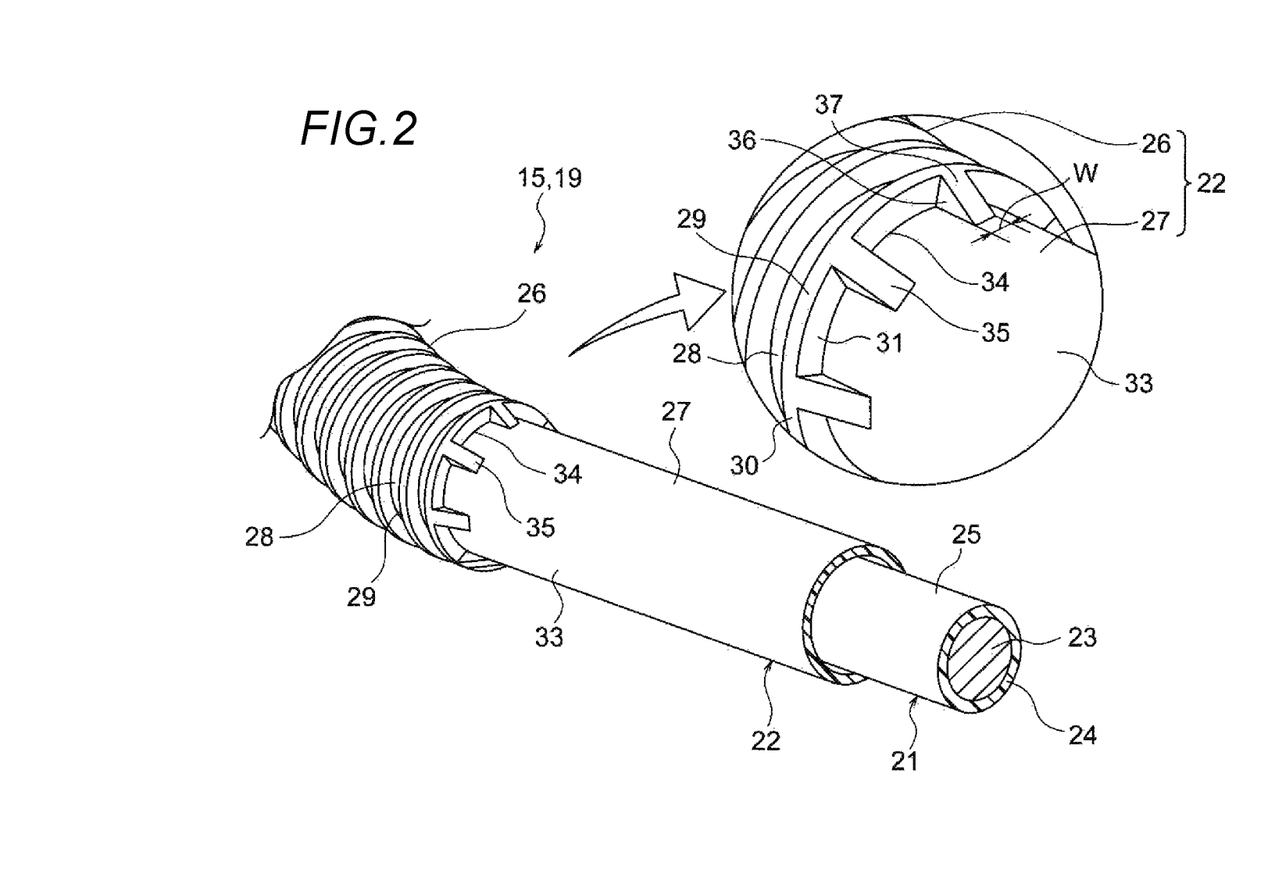
FIG. 2 is a perspective view of a configuration of the wire harness of the invention (the inside of a circle is an enlarged view of the main portions of the wire harness).
Figure 3:
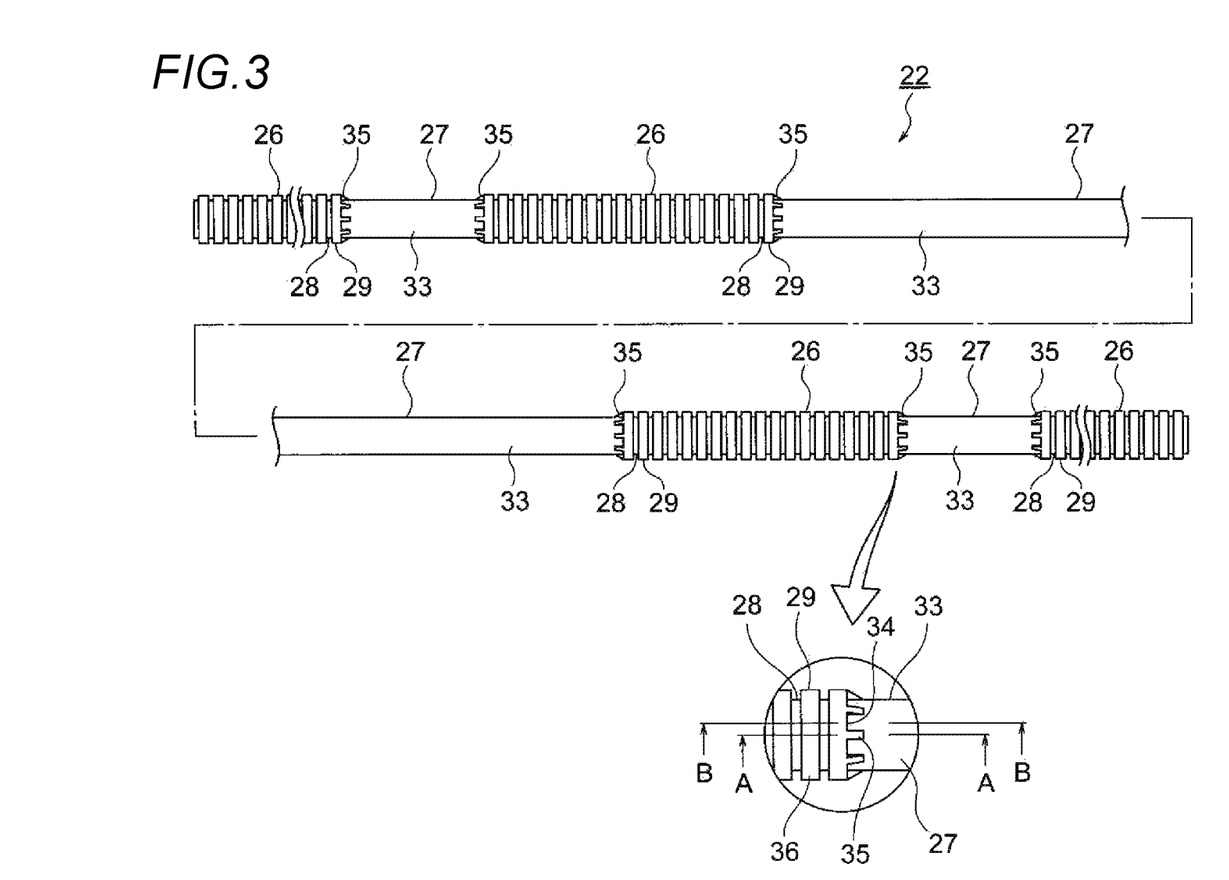
FIG. 3 is a front view of a configuration of an exterior member shown in FIG. 2 (the inside of a circle is an enlarged view of the main portions of the wire harness).
Figure 4A:
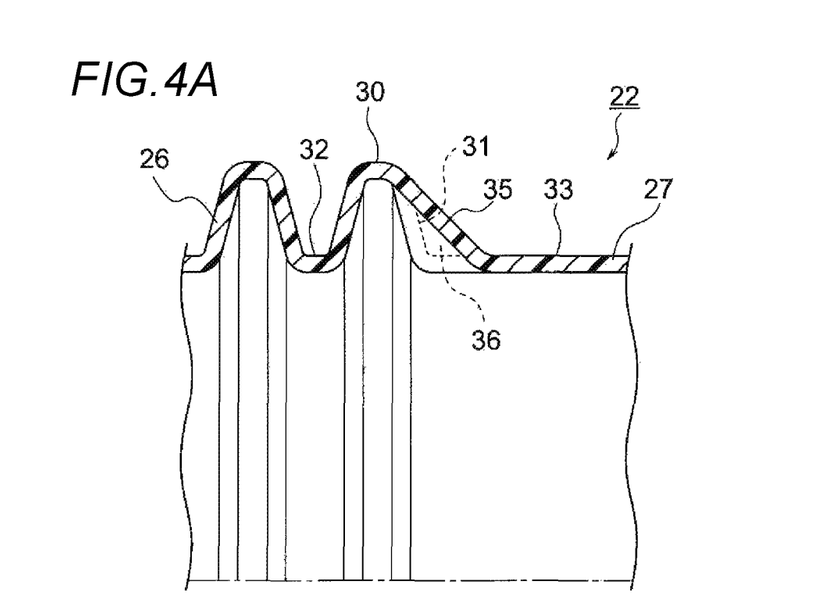
FIG. 4A is a section view taken along the A-A line.
Figure 4B:
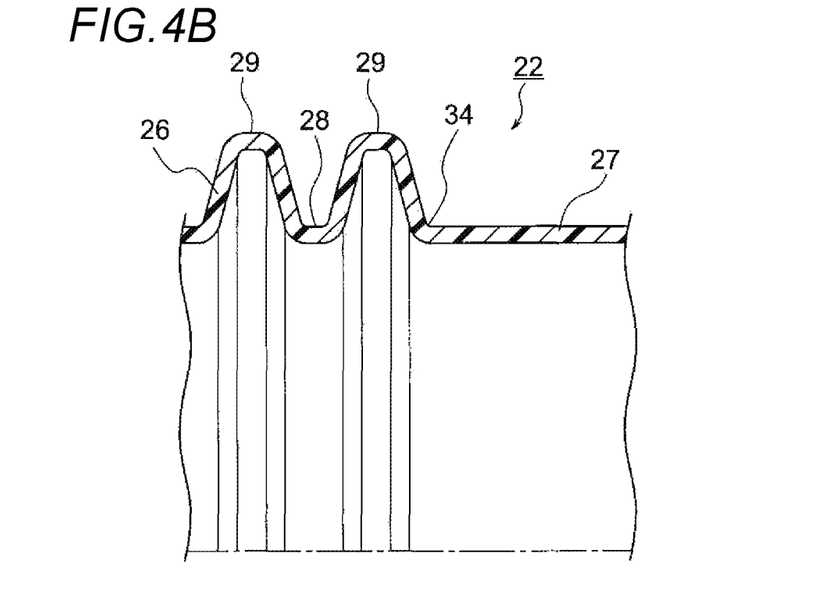
FIG. 4B is a section view taken along the B-B line (Embodiment 1).
Figure 5A:
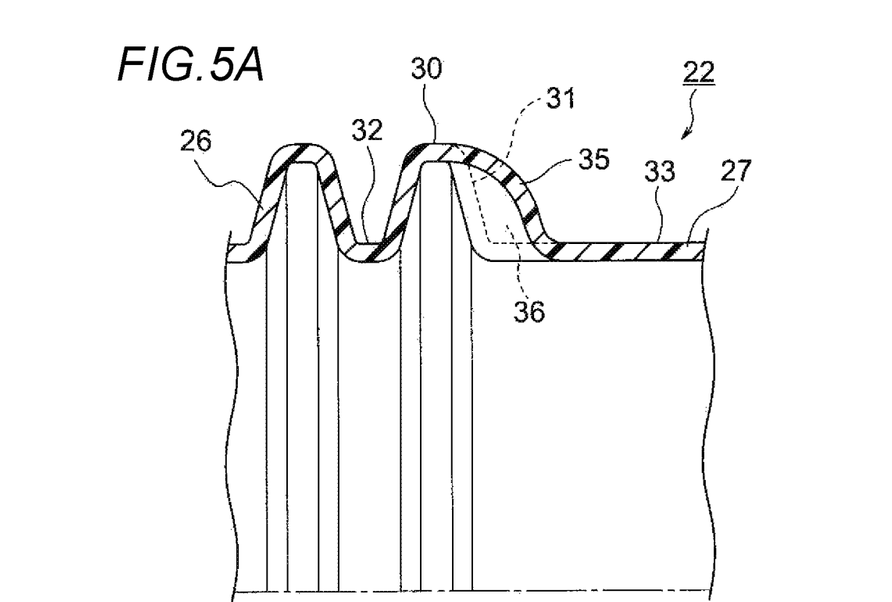
FIG. 5A is a section view taken along the A-A line and FIG. 5B is a section view taken along the B-B line (Embodiment 1).
Figure 5B:
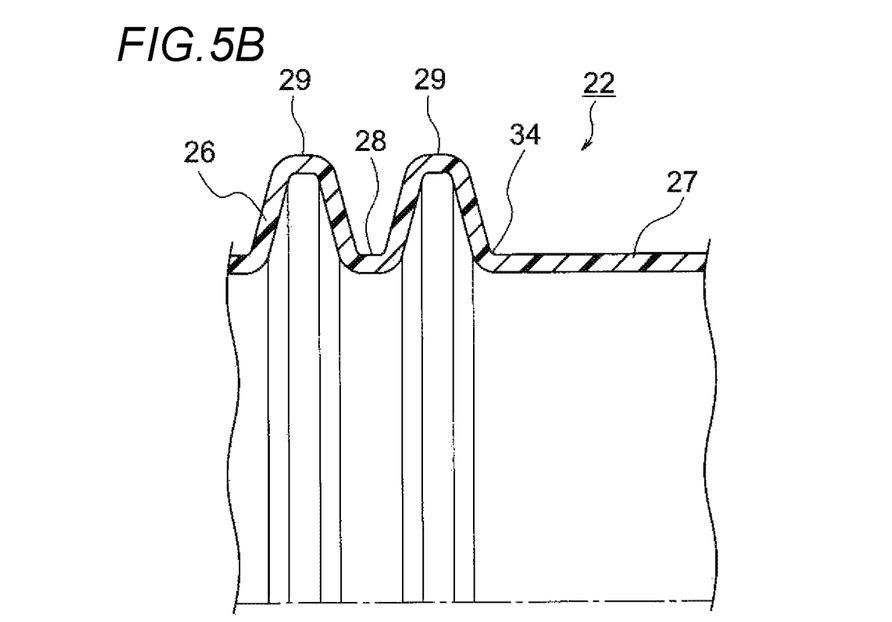
Figure 6:
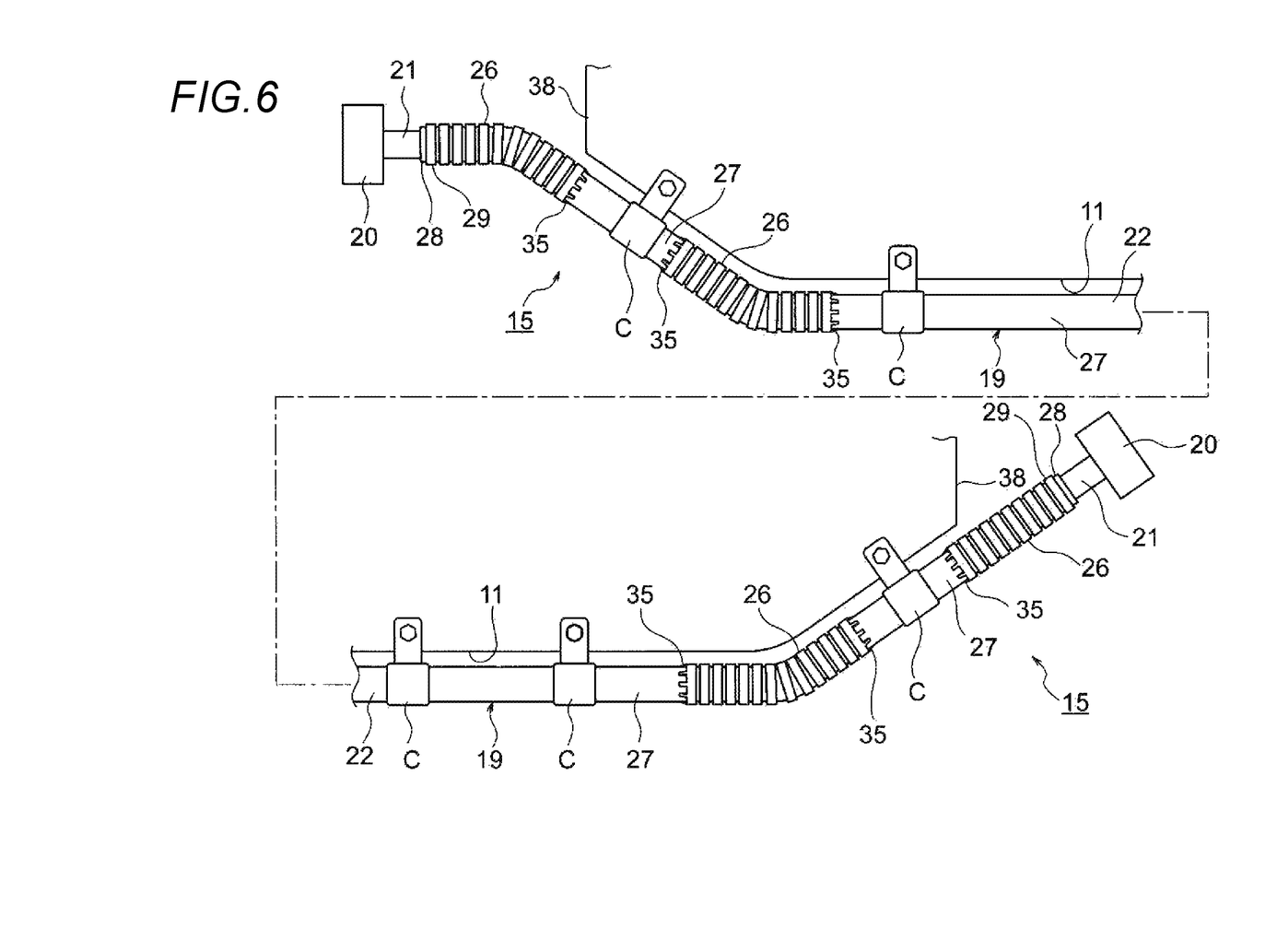
FIG. 6 shows the route wired state of the wire harness shown in FIG. 2 (Embodiment 1).

Description is given below of an embodiment 1 with reference to the drawings. FIGS. 1A and 1B show a wire harness according to the invention, while FIG. 1A is a schematic view of the wired state of a high voltage wire harness, and FIG. 1B is a schematic view of the wired state of a low voltage wire harness different from the wire harness shown in FIG. 1A. Also, FIG. 2 is a perspective view of a configuration of the wire harness of the invention, FIG. 3 is a front view of a configuration of an exterior member shown in FIG. 2, FIGS. 4A and 4B are section views of the exterior member shown in FIG. 3, FIGS. 5A and 5B are section views of a modification of FIGS. 4A and 4B, and FIG. 6 shows the wired state of the wire harness shown in FIG. 2.

In this embodiment, the invention may be applied to a wire harness to be arranged in a hybrid car (which may also be an electric car or an ordinary car running on an engine).

<Configuration of Hybrid Car 1>

In FIG. 1A, reference numeral 1 designates a hybrid car. The hybrid car 1 is a vehicle to be driven by mixing two kinds of power of an engine 2 and a motor unit 3, while electric power from a battery 5 (battery pack) is supplied through an inverter unit 4 to the motor unit 3. The engine 2, motor unit 3 and inverter unit 4 are mounted in an engine room 6 at a position where, in this embodiment, front wheels and the like are present. Also, the battery 5 is mounted in a car rear part 7 at a position where rear wheels and the like are present (the battery 5 may also be mounted within a car room existing backward of the engine room 6).

The motor unit 3 and inverter unit 4 are connected to each other by a high pressure wire harness 8 (a motor cable for a high voltage). Also, the battery 5 and inverter unit 4 are connected together by a high pressure wire cable 9. An intermediate part 10 of the wire harness 9 is arranged in a vehicle underfloor 11 provided in a vehicle (car body). The intermediate part 10 is also arranged along the vehicle underfloor 11 substantially in parallel thereto. The vehicle underfloor 11 is a well-known body (car body) and a so called panel member, while it has a penetration hole at a given position thereof. The wire harness 9 is to be watertight inserted into this penetration hole.

The wire harness and battery 5 are connected together through a junction block 12 provided in the battery 5. To the junction block 12, there is electrically connected an external connecting member such as a shield connector 14 arranged in the rear end side harness terminal 13 of the wire harness 9. Also, the wire harness 9 and inverter unit 4 are connected together through an external connecting member such as a shield connector 14 arranged in a front end side harness terminal 13.

The motor unit 3 is constituted of a motor and a generator. Also, the inverter unit 4 is constituted of an inverter and a converter. The motor unit 3 is formed as a motor assembly including a shield case. The inverter unit 3 is also formed as an inverter assembly including a shield case. The battery 5 is a Ni-MH type battery or a Li-ion type battery and can be produced by modularization. Here, a power storage device such as a capacitor can also be used. The battery 5, of course, is not particularly limited so long as it can be used in the hybrid car 1 or an electric car.

In FIG. 1B, reference numeral 15 designates a wire harness. This wire harness 15 is for a low pressure (for a low voltage) and is used to electrically connect together a low pressure battery 16 arranged in the car rear part 7 of the hybrid car 1 and an auxiliary device 18 (equipment) mounted in the car front part 17 thereof. The wire harness 15, similarly to the wire harness 9 shown in FIG. 1A, is arranged through the vehicle underfloor 11 (this is an example, and thus it may also be arranged through the car room side).

As shown in FIGS. 1A and 1B, in the hybrid car 1, there are arranged the high pressure wire harnesses 8, 9 and low pressure wire harness 15. Although the invention can be applied to any one of these harnesses, as a representative example, description is given below of the low pressure wire harness 15. Firstly, description is given of the configuration and structure of the wire harness 15.

<Configuration of Wire Harness 15>

In FIG. 1B, the wire harness 15, which has a long size and is arranged through the vehicle underfloor 11, is constituted of a harness main body 19 and two connectors 20 respectively provided on the two ends of the harness main body 19. The wire harness 15 is further constituted of a clamp C (see FIG. 6) for arranging itself at a given position, and a water stop member (for example, a grommet) (not shown).

<Configuration of Harness Main Body 19>

In FIG. 2, the harness main body 19 is constituted of a conductive path 21 and an exterior member 22 for storing and protecting the conductive path 21. Here, referring to the number of conductive paths 21, in this embodiment, the number is one but this is an example (it may also be two or three). Also, with respect to the exterior member 22, there may also be employed an exterior member which is designed to store and protect the high pressure wire harness 9 together with the wire harness 15.

<Conductive Path 21>

In FIG. 2, the conductive path 21 is constituted of a conductor 23 and an insulator 24 for covering the conductor 23. The conductor 23 is formed of copper or a copper alloy, or aluminum or an aluminum alloy into a shape having a circular section. The conductor 23 may have a conductor structure made by twisting strands together, or a stick-like conductor structure having a rectangular or a circular (round) section (for example, a conductor structure having a flat single core or a round single core; in this case, wires themselves have stick-like shapes). On the outer surface of the above conductor 23, the insulator 24 formed of resin material is extrusion molded.

The insulator 24 is extrusion molded on the outer peripheral surface of the conductor 23 using thermoplastic resin material. It is formed as a coating having a circular section and has a given thickness. As the above-mentioned thermoplastic resin, various kinds of well-known resin can be used, and the resin can be properly selected from polymer material, for example, polyvinyl chloride resin, polyethylene resin and polypropylene resin. Here, reference numeral 25 designates the outer peripheral surface of the conductive path 21 (here, it corresponds to the outer peripheral surface of the insulator 24).

<Exterior Member 22>

In FIGS. 2 and 3, the exterior member 22 is formed by resin molding to have a single straight tube shape (before it is used, it is straight). Also, it is formed in a shape having no body split (in other words, it is formed in a slit-less shape (it is formed in a shape other than a split-tube shape)). Further, it is formed in a shape having a circular section (in this embodiment, it is formed in a perfect circular shape; but, this is an example, and thus it may also be formed in a shape having an oval, or elliptical, or rectangular section (see an embodiment 2)).

The exterior member 22 includes a flexible tube part 26 and a straight tube part 27 functioning as a part for arranging the conductive path 21 straight thereon. The flexible tube part 26 and straight tube part 27, as shown in FIG. 3, are formed in multiple numbers and are arranged alternately.

<Flexible Tube Part 26>

In FIGS. 2 to 6, the flexible tube part 26 is arranged according to the vehicle installation shape (the shape of the wiring destination of the wire harness; the shape of an installation target 38). Also, it is formed to have a length matched to the shape of the vehicle installation shape. The length of the flexible tube part 26 is not constant but it is set to a required length according to the vehicle installation shape. Such flexible tube part 26 is formed in such a portion as it can be flexed at a desired angle when the wire harness is stored in a packed state, is transported, and is route-wired to the vehicle. That is, it is formed in such portion as it can be flexed into a bent shape and also can be naturally returned the original straight state as shown in the drawings (the state when it was resin molded).

The flexible tube part 26 is formed in a bellows tube shape. Specifically, it is formed such that it includes bellows recesses 28 and bellows projections 29 respectively extending in the peripheral direction and also that the bellows recesses 28 and bellows projections 29 continue with each other alternately in the tube axial direction. In FIGS. 4A and 4B, reference numeral 30 designates the top of each bellows projection 29, and reference numeral 31 designates the slope thereof. Meanwhile, reference numeral 32 in the bellows recess 28 designates the groove bottom thereof.

<Straight Tube Part 27>

In FIGS. 2 to 6, the straight tube part 27 is formed as a part which does not have such flexibility as the flexible tube part has. It is also formed as a part which does not bend in the packed state, transporting time and route wiring time of the wire harness (a part which does not bend means a part which does not positively have flexibility). It is also formed in a long straight tube shape. The outer peripheral surface 33 of such straight tube part 27 is formed as a part which has a shape with no uneven portions (this is just an example; and thus, such a shape as used in an embodiment 2 may also be employed).

The straight tube part 27 is formed in a rigid portion when compared with the flexible tube part 26. Such straight tube part 27 is formed in such position and length as correspond to the vehicle installation shape. Here, the longest straight tube part 27, in this embodiment, is formed as a part to be arranged in the vehicle underfloor 11 (see FIGS. 1A and 1B).

<Continuous Portion 34 of Flexible Tube Part 26 and Straight Tube Part 27>

In FIGS. 2 to 6, the continuous portion 34 of the flexible tube Part 26 and straight tube part 27 includes multiple reinforcement shape portions 35. The multiple reinforcement shape portions 35 are formed such that eight reinforcement shape portions are scattered at an equal pitch in the tube outer peripheral direction of the exterior member 22 ("equal pitch" is preferable; and, the number of the reinforcement shape portions is an example). The multiple reinforcement shape portions 35 scattered in the tube outer peripheral direction are formed as the characteristic aspect of the invention.

<Reinforcement Shape Portions 35>

In FIGS. 2 to 6, the reinforcement shape portions 35 are formed as portions which can withstand stress concentration in the continuous portion 34. In other words, they are formed as portions to increase the strength of the continuous portion 34. Such reinforcement shape portions 35 are formed in a projecting portion which connects together the slope 31 of the bellows projection 29 of the flexible tube part 26 and the outer peripheral surface 33 of the straight tube part 27. The reinforcement shape portions 35 are also formed in a projecting portion having a substantially triangular side surface 36 (a shape shown in FIGS. 5A and 5B are described later). Each reinforcement shape portion 35 is formed so as to continue from the top 30 of the bellows projection 29.

Each reinforcement shape portion 35 also includes a reinforcement shape portion slope 37 besides the side surface 36. This reinforcement shape portion slope 37, in this embodiment, is formed in a rectangular shape. The width W of the reinforcement shape portion slope 37 is set to an arbitrary length. Here, the reinforcement shape portion slope 37 may be either wide or narrow. That is, it is not particularly limited so long as it can increase the strength of the continuous portion 34.

The reinforcement shape portion 35 is formed in a shape which produces a space when viewed from inside the exterior member 22. That is, it is formed in a hollow shape as shown in FIG. 4A. Also, it is formed in a portion which produces no (or a small) change in thickness with respect to the peripheral portions (such as the continuous portion 34 and bellows projection 29).

<Modification of Reinforcement Shape Portion 35>

A reinforcement shape portion 35 shown in FIGS. 5A and 5B is formed in a projecting portion including a side surface 36 having a substantially ¼ circular shape (fan shape). In this invention, a reinforcement shape portion 35 having such aside surface shape and other reinforcement shape portion (not shown) having, for example, a substantially square or pentagonal side surface are also effective.

<Manufacture~Route Wiring of Wire Harness 15>

In the above configuration and structure, the wire harness 15 is manufactured as follows (see, for example, FIGS. 2 and 6). That is, the wire harness 15 is manufactured by inserting the conductive path 21 from one end opening to the other end opening of the exterior member 22 the whole of which is resin molded substantially in a straight shape. Also, the wire harness 15 is manufactured by installing a cramp C, a grommet, boots etc. at given positions of the outer surface of the exterior member 22. Further, the wire harness 15 is manufactured by providing a connector 20 on the end part of the conductive path 21.

After the wire harness 15 is manufactured as described above, a specific flexible tube part 26 is folded into a bent state, thereby completing packing of the wire harness 15. The packed wire harness 15 is compact and, in such compact state, it is transported to a vehicle assembling site.

In the vehicle assembling site, the wire harness 15 is installed in the installation target 38 of the vehicle from such long part as corresponds to the vehicle underfloor 11 (see FIGS. 1A and 1B). Since, in the wire harness 15, the longest straight tube part 27 of the exterior member 22 is arranged in such long portion thereof as corresponds to the vehicle underfloor 11, the wire harness 15 is installed in a deflection suppressed state. At this time, the wire harness 15 is installed with good workability. After the long portion corresponding to the vehicle underfloor 11 is fixed by the cramp C or the like, while deflexing (bending) the flexible tube part 26 portion of the exterior member 22, the remaining portions are installed. When a series of operations related to installation are completed, the wire harness 15 is put in a state where it has been wired in a desired route.

<Effects of the Embodiment 1>

As has been described heretofore with reference to FIGS. 1 to 6, according to the wire harness 15 of the embodiment 1, in the continuous portion 34 of the flexible tube part 26 and straight tube part 27 of the exterior member 22, the multiple reinforcement shape portions 35 function as an effective strength increasing portion. Therefore, according to the wire harness 15 of the embodiment 1, even if stress concentration occurs in the continuous portion 34, for example, on receiving vibrations during running of the vehicle, the multiple reinforcement shape portions 35 can withstand such stress concentration, thereby enabling prevention of occurrence of cracks and breakage in the continuous portion 34.

Further, according to the wire harness 15 of the embodiment 1, since the multiple reinforcement shape portions 35 are scattered at an equal pitch in the tube outer peripheral direction, the strength of the continuous portion 34 can be enhanced uniformly in the tube outer peripheral direction.

[Embodiment 2]

Figure 7:
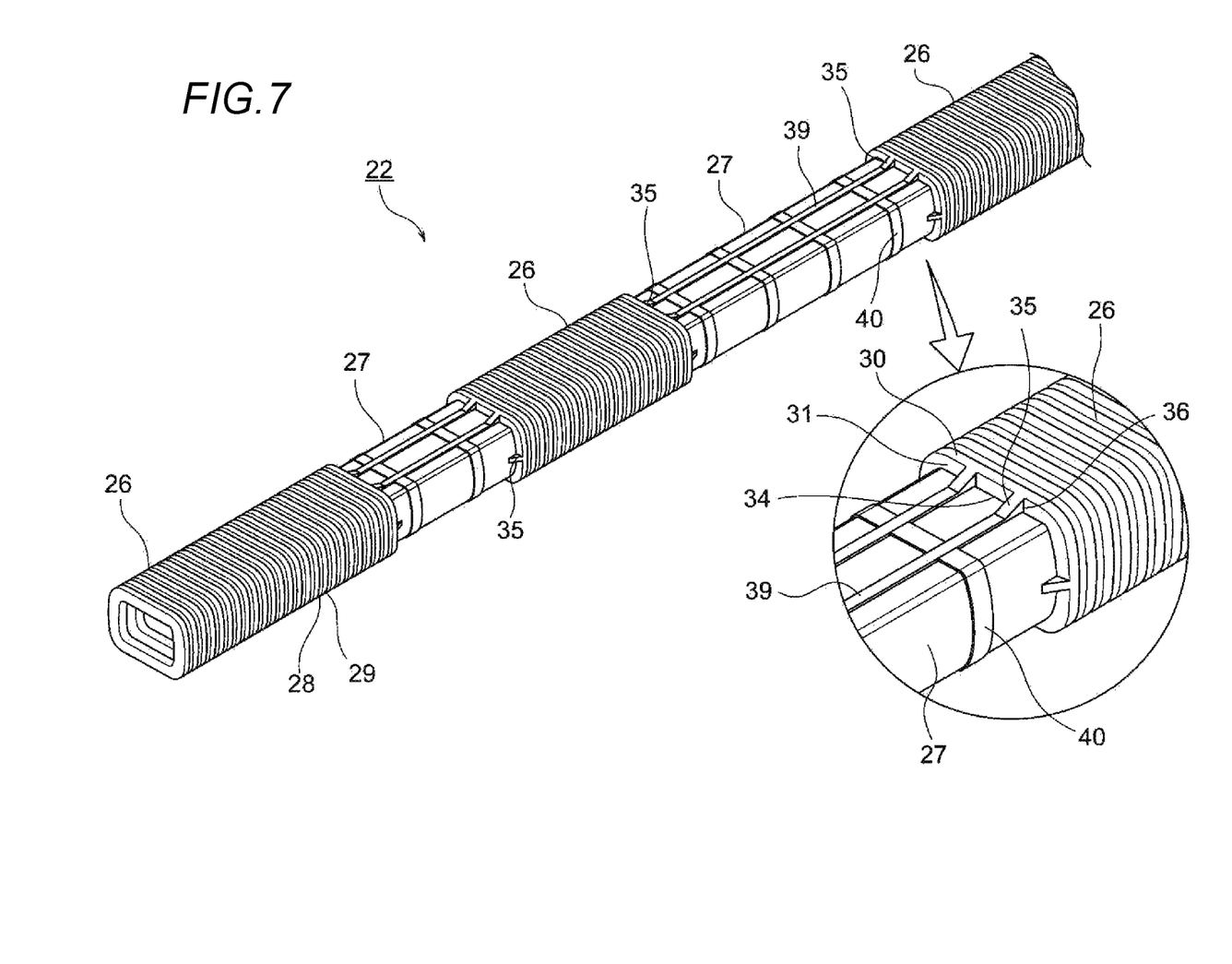
FIG. 7 is a perspective view of an exterior member used in a second embodiment (the inside of a circle is an enlarged view of the main portions of the exterior member) (Embodiment 2).

Description is given below of an embodiment 2 with reference to the drawing. FIG. 7 is a perspective view of an exterior member according to another embodiment (the inside of a circle is a perspective view). Here, the same composing parts as the embodiment 1 are given the same designations and thus the detailed description thereof is omitted.

<Exterior Member 22 of Embodiment 2>

In FIG. 7, an exterior member 22 according to an embodiment 2 is a resin molded product which includes a flexible tube part 26 and a straight tube part 27 serving as a part on which, for example, two conductive paths can be wired straight. The flexible tube part 26 and straight tube part 27 are respectively formed in multiple numbers. Also, the flexible tube parts 26 and straight tube parts 27 are arranged alternately. The exterior member 22 of the embodiment 2, as can be seen from FIG. 7, is formed in a flat shape.

<Flexible Tube Part 26 and Straight Tube Part 27>

The flexible tube part 26 is formed in a bellows tube shape having bellows recesses 28 and bellows projections 29. The straight tube part 27 includes on the outer peripheral surface 33 thereof multiple ribs 39, 40 for increasing the strength of the straight tube part 27 itself.

<Continuous Portion 34 and Reinforcement Shape Portion 35>

In the continuous portion 34 of the flexible tube part 26 and straight tube part 27, there are formed multiple reinforcement shape portions 35. In this embodiment, six reinforcement shape portions 35 are formed so as to be scattered in the tube outer peripheral direction of the exterior member 22. Four of the six reinforcement shape portions 35 are formed so as to continue with the ribs 39. Each reinforcement shape portion 35 is formed so as to continue from the top 30 of the bellows projection 29.

<Effects of the Embodiment 2>

As described hereinabove with reference to FIG. 7, employment of the exterior member 22 of the embodiment 2 can provide similar effects to the embodiment 1. That is, occurrence of cracks and breakage due to stress concentration can be prevented.

Also, of course, the invention can be enforced while changing it variously without departing from the subject matter of the invention.

[Description of Reference Numerals and Signs]

| | | | |
|---|---|---|---|
| 1: Hybrid car | 2: Engine | 3: Motor unit |
| 4: Inverter unit | 5: Battery | 6: Engine room |
| 7: Car rear part | 8, 9: Wire harness | |
| 10: Intermediate part | 11: Vehicle underfloor | |
| 12: Junction block | 13: Harness terminal | |
| 14: Shield connector | 15: Wire harness | |
| 16: Low pressure battery | 17: Car front part | |
| 18: Auxiliary device | 19: Harness main body | |
| 20: Connector | 21: Conductive path | |
| 22: Exterior member | 23: Conductor 24: Insulator |
| 25: Outer peripheral surface | 26: Flexible tube part | |
| 27: Straight tube part | 28: Bellows recess | |
| 29: Bellows projection | 30: Top 31: Slope |
| 32: Groove bottom | 33: Outer peripheral surface | |
| 34: Continuous Portion | | |
| 35: Reinforcement shape portion | 36: Side surface | |
| 37: Reinforcement shape portion slope | | |
| 38: Installation target | | |
| 39, 40: Rib | C: Cramp | |

What is claimed is:

1. A wire harness, comprising:
a tube-shaped exterior member; and
one or multiple conductive paths to be inserted into and protected by the exterior member,
wherein the exterior member includes a flexible tube part having a flexible bellows tube shape and a straight tube part not having the flexible bellows tube shape,
wherein the one or multiple conductive paths are straightly wired into the straight tube part and the straight tube part is continuous with the flexible tube part,
wherein a continuous portion is a junction between the flexible tube part and the straight tube part and includes multiple reinforcement shape portions formed on the junction which reinforce the continuous portion and are arranged in a tube outer peripheral direction of the exterior member, and
wherein each of the multiple reinforcement shape portions is a projecting portion that is integrally formed with a slope of an outermost bellows projection of the flexible tube part and an outer peripheral surface of the straight tube part, and which has a substantially polygonal shaped side surface or a substantially ¼ circular shaped side surface.

2. The wire harness according to claim 1, wherein the multiple scattered reinforcement shape portions are arranged at an equal pitch in the tube outer peripheral direction.

3. The wire harness according to claim 1, wherein, in an area connecting the slope and the outer peripheral surface of the straight tube part, a portion of the upper surface of the slope is arranged away from a portion of a lower surface of the projecting portion.

4. A wire harness, comprising:

a tube-shaped exterior member; and one or more multiple conductive paths to be inserted into and protected by the exterior member, wherein the tube-shaped exterior member includes a flexible tube part having a flexible bellows tube shape and a straight tube part not having the flexible bellows tube shape, wherein the one or multiple conductive paths are straightly wired into the straight tube part and the straight tube part is continuous with the flexible tube part, wherein a continuous portion of the flexible tube part and the straight tube part includes multiple reinforcement shape portions which reinforce the continuous portion and are arranged in a tube outer peripheral direction of the exterior member, wherein each of the multiple reinforcement shape portions is a projecting portion which connects a slope of an outermost bellows projection of the flexible tube part and an outer peripheral surface of the straight tube part and which has a substantially polygonal shaped side surface or a substantially ¼ circular shaped side surface, and wherein each of the multiple reinforcement shape portions slope in a longitudinal direction of the tube-shaped exterior member from the slope of the outermost bellows projection to the outer peripheral surface of the straight tube part.

\* \* \* \* \*